Dec. 14, 1937.  A. R. GUNNERSON  2,102,068
BULL RAKE
Filed Sept. 18, 1936  3 Sheets-Sheet 3
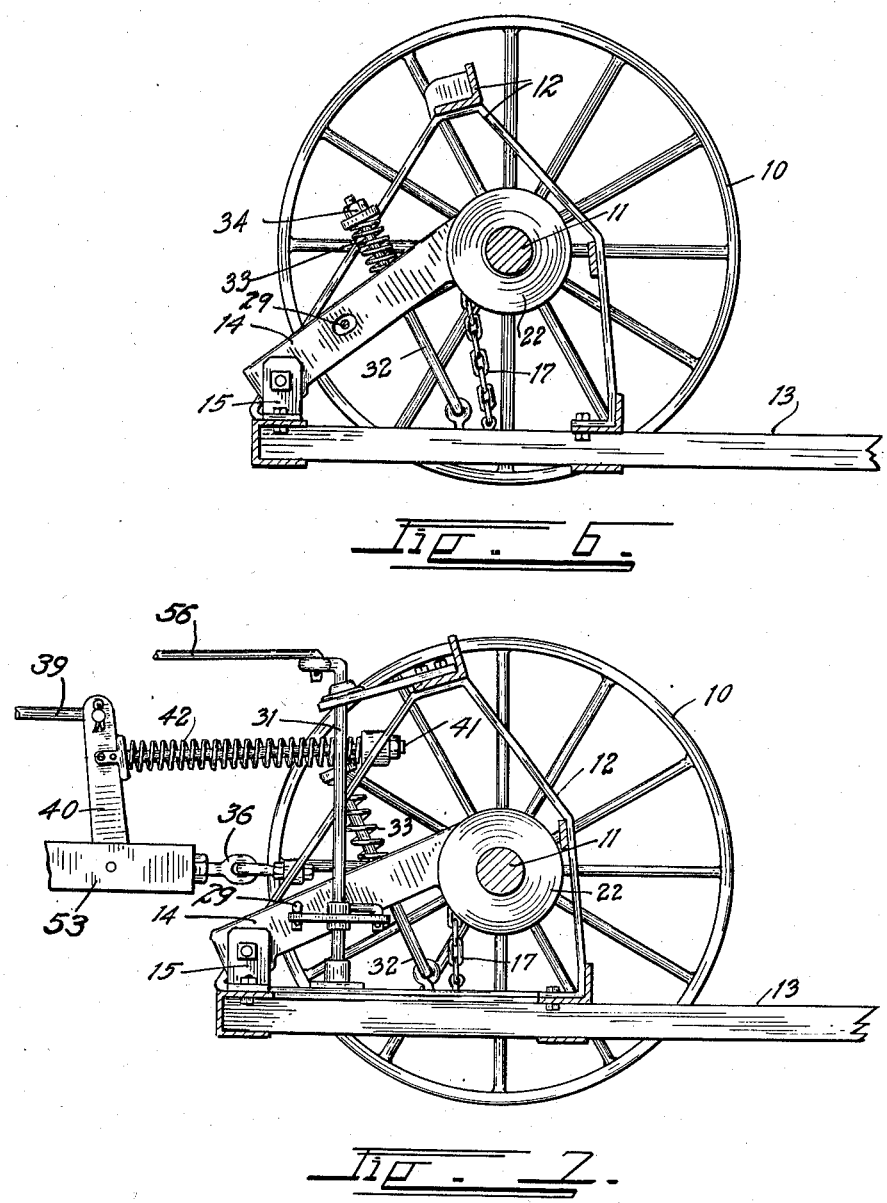
INVENTOR.
ARTHUR R. GUNNERSON
BY
ATTORNEY.

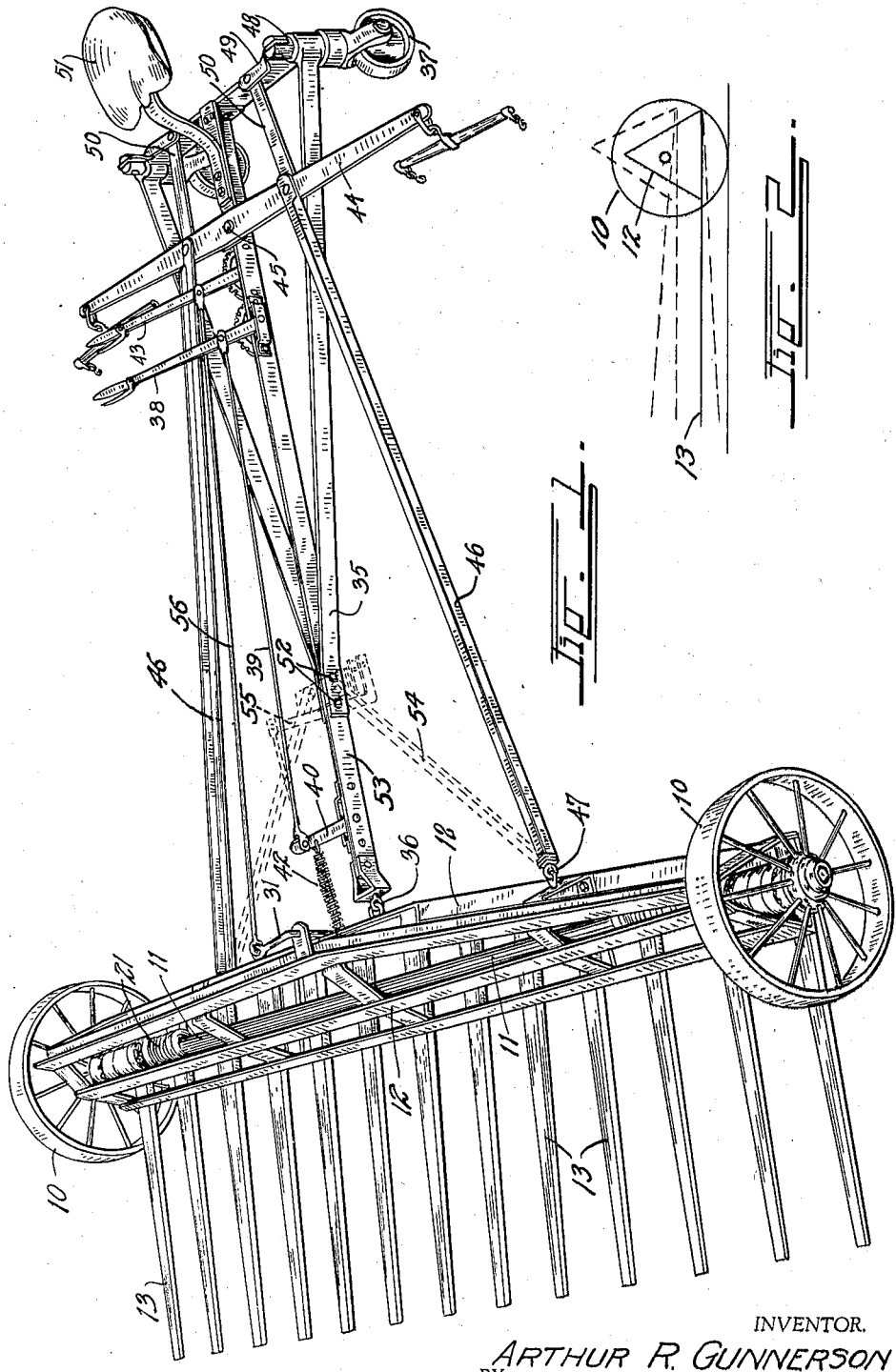

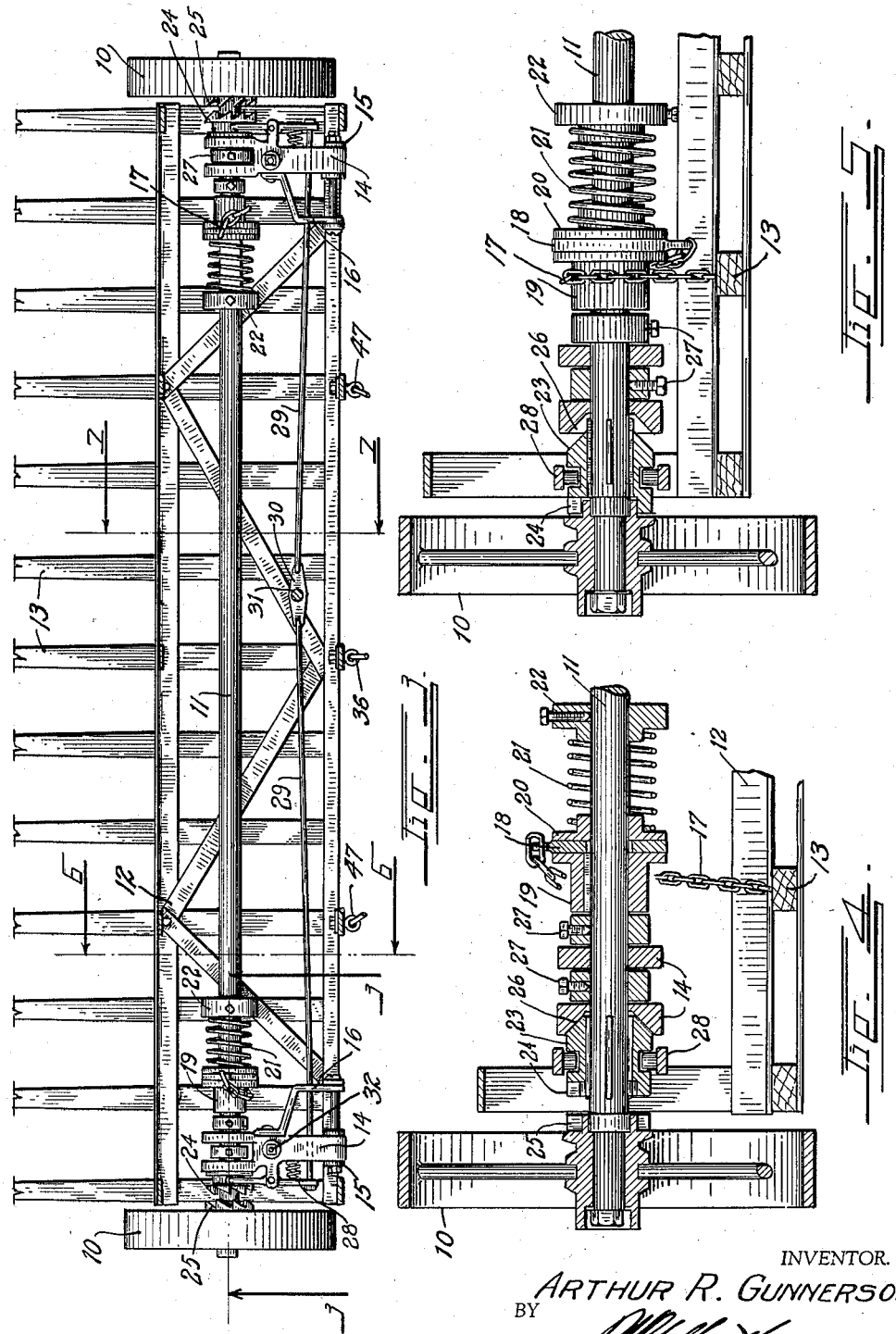

Patented Dec. 14, 1937

2,102,068

UNITED STATES PATENT OFFICE 2,102,068

BULL RAKE

Arthur R. Gunnerson, Denver, Colo.

Application September 18, 1936, Serial No. 101,473

5 Claims. (Cl. 56—398)

This invention relates to a bull rake and has for its principal object the provision of a rake of this character which can be inclined upwardly at the front to hold the hay in place thereon, upwardly at the back to assist in sliding the hay therefrom, and raised and lowered while retaining a horizontal position to more efficiently receive and carry the hay.

Another object of the invention is to provide a rake which can be steered by means of both the front and rear wheels so that it can be accurately guided and turned in relatively sharp arcs.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of the complete bull rake.

Fig. 2 is a diagrammatic side elevation illustrating typical positions in which the rake teeth may be placed.

Fig. 3 is a plan view of the rake frame.

Fig. 4 is a detail section, illustrating the clutch member in the disengaged position.

Fig. 5 is a similar section illustrating the clutch member in the engaged position.

Fig. 6 is an enlarged cross section through the axle portion, taken on the line 6—6, Fig. 3, illustrating the rake in the lowered position.

Fig. 7 is a similar view taken on the line 7—7, Fig. 3, illustrating the rake in the elevated position.

The invention comprises a pair of ground-engaging wheels 10 journalled on the extremities of a transverse axle 11. An A-shaped truss 12 extends longitudinally of the axle 11 and surrounds the latter. Rake teeth 13 are secured to the bottom of the truss 12 and extend forward therefrom. The truss is free to move upwardly and downwardly with relation to the axle 11. Its relative position with respect to the axle is maintained by means of hinge levers 14 which extend from brackets 15 on the rear side extremities of the truss 12 to a pivot mounting on the axle 11.

It can be readily seen that the levers 14 always hold the truss 12 in its proper spaced relation about the axle 11, and always maintain the truss in parallel relation with the axle. Side sway in the truss is prevented by means of side brace arms 16 which extend outwardly from the levers 14 to a hinged attachment on the truss.

The truss is raised and lowered with relation to the axle 11 by means of chains 17. The chains 17 at their lower extremities are secured to the truss 12 and at their upper extremities are secured to a clutch ring 18. The clutch ring 18 surrounds the axle and is pressed between a flanged collar 19 and a thrust ring 20 by means of a compression spring 21. The spring 21 acts against a set collar 22 fixed on the axle 11. Thus, when the axle 11 rotates, the frictional engagement of the clutch ring 18 will cause it to reel the chain 17 about the collar 19, thus, raising the entire truss and the entire rake.

The axle 11 may be caused to rotate at any desired time by the actuation of a pair of clutch members 23 provided with dogs 24 in their outer faces which may be brought into engagement with coacting dogs 25 on the wheels 10. The inner face of each of the clutch members 23 is formed with a beveled friction surface 26 which engages a coacting friction surface on the lever 14. The lever 14 is prevented from moving along the axle 11 by means of suitable set collars 27.

The clutch member 23 is actuated through the medium of a yoke 28 which in turn is actuated by connecting rods 29 from a bell-crank lever 30 which is fixed on a vertical control shaft 31 at the middle of the truss. If the control shaft 31 is rotated clockwise, it will engage both clutch members 23 so that the axle 11 will rotate with the wheels 10 to wind in the chains 17 and lift the entire rake.

If the clutch dogs remain engaged when the rake reaches its extreme raised position, the rings 18 will slide between the members 19 and 20 so that no damage is done and the rake is held elevated. The operator can now rotate the control shaft 31 in the opposite direction, thus disengaging the dogs 25 and throwing the clutch members against the frictional surfaces on the levers 14. Since the latter are stationary, they will hold the rake in the suspended position until released by the operator.

To assist the chains in lifting the rake and to counterbalance the load thereon, a pair of counter-weight rods 32 acting against compression springs 33 are provided at each of the levers 14. The compression in the springs 33 can be regulated to accommodate the weight of the rake by means of spring adjusting nuts 34.

It can be seen that the rake teeth always rise in fixed relation to the position of the truss 12. If this truss is maintained vertical, the rake teeth will rise horizontally and if the truss is tilted, it will result in a corresponding tilt to the rake teeth 13. The position of the truss 12 is controlled from a medial frame 35 which is universally hinged at its forward extremity to the truss 12 as shown at 36. The frame 35 is supported upon guide wheels 37 at its rear extremity.

The vertical angle of the truss is controlled by means of a hand lever 38 which is connected through a connecting rod 39 to a forward lever 40. A pull rod 41 extends forwardly from the lever 40 to a pulling connection with the truss 12. A compression spring 42 surrounds the rod 41 and acts to constantly push the truss 12 forwardly. Thus, any weight upon the rake teeth is resisted by the pull of the rod 41 and any upward thrust on the rake teeth, such as caused by riding over a rise in the ground, will be absorbed in compressing the spring 42. The clutches are operated by means of a hand lever 43 connected through a connecting rod 56 to the control shaft 31.

Thus, the operator can, by manipulating the levers 38 and 43 cause the rake teeth to rise in a horizontal plane or can tilt the forward extremities upwardly or downwardly, as shown by the positions in the diagram of Fig. 2.

The entire rake is steered by means of a steering bar 44 pivoted at 45 to the frame 35. The steering bar 44 is connected by means of braces 46 with the truss 12 through universal hinges 47. The wheels 37 are mounted upon steering posts 48 from which steering levers 49 extend. The steering levers 49 are also connected to the steering bar 44 by means of connecting links 50. Thus, if the left end of the steering bar is forced forwardly, it will swing the left side of the rake forwardly causing the entire device to turn toward the right. It will also swing the left lever 49 forwardly and the right lever 49 rearwardly so as to turn the wheels 37 to the left to cause them to follow around the arc to which the front wheels have been turned. Thus, a rapid steering action is obtained which effects both the front and rear of the rake to allow it to be rapidly and readily brought into position.

A suitable seat 51 is provided for the operator. The seat is so positioned that the operator's feet control the steering bar 44 while his hands can conveniently reach the levers 38 and 43.

In the usual rake, the forward extremities of the teeth are dropped to receive the hay. This requires the hay to be drawn uphill along the teeth to reach its position on the rake. In the present invention, both the front and rear of the teeth are dropped so that the hay travels onto the rake without any uphill movement. While carrying the hay to the stacker, the entire rake is lifted, and, if desired, the front of the teeth can be lifted higher than the back thereof so that the hay is securely supported above the ground to relieve the load on the team. Upon reaching the stacker, the front of the teeth can be dropped while the rear is elevated to allow the hay to move downhill on to the stacker, thereby insuring a clean deposit of the hay. The steerable front wheels greatly assist the operator in aligning his rake with the stacker teeth.

The rake may be tractor or team operated. If team operated, the single trees are hitched to the opposite extremities of the steering bar.

For tractor operation, the frame 35 is disconnected at its midpoint through suitable attachment bolts 52, so that the entire rear portion is eliminated. The short forward member of the frame 35, indicated at 53, is then connected directly to the front of the tractor. The truss is braced from this member by means of short diagonal braces, as indicated in broken line at 54. The connecting rod 39 is replaced by a short rod, as indicated in broken line at 55, so that the angle of the rake may be controlled from the tractor. The rod 56 is replaced by a suitable chain or cable which will enable the tractor driver to operate the clutch mechanism.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A rake of the type described comprising: a pair of supporting wheels; an axle extending between said wheels; a truss enclosing said axle; rake teeth extending forwardly from said truss; hinged levers extending from said axle to said truss to maintain them in a predetermined relative relation; friction clutch members, stationary with respect to the hinged levers; a clutch member movable between the wheels and the stationary members, comprising; means for alternately connecting the axle to the wheels to be rotated thereby and for connecting it to the friction clutch members to hold it from reverse rotation, and flexible members extending between the axle and the truss, to support the latter, the flexible members being windable about the axle.

2. A rake of the type described comprising: a pair of supporting wheels; an axle extending between said wheels; a truss enclosing said axle; rake teeth extending forwardly from said truss; hinged levers extending from said axle to said truss to maintain them in their relative relation; and means for raising and lowering said truss relative to said axle comprising: flexible members having one end connected with the axle for winding thereabout; a frame extending rearwardly from said truss; means for universally hinging said frame to said truss at its forward extremity; wheels supporting the rearward extremity of said frame; means on said frame for pivoting the truss about the axle; means for angularly adjusting the truss relative to the frame about a vertical pivot, and for simultaneously effecting a rotary adjustment of the wheels about vertical pivots.

3. A rake of the type described comprising: a pair of supporting wheels; and axle extending between said wheels and normally rotatable thereon; a truss enclosing said axle; rake teeth extending forwardly from said truss; hinged levers extending from said axle to said truss to maintain them in their relative relation; and means for raising and lowering said truss relative to said axle; a frame extending rearwardly from said truss; means for universally hinging said frame to said truss at its forward extremity; wheels supporting the rearward extremity of said frame; means on the frame for pivoting the truss about the axle comprising; a lever mounted on said frame for swinging said truss rearwardly; a spring member for urging said truss forwardly, and means for simultaneously altering the angular relation of the truss and the wheels, relative to the frame, about vertical pivots.

4. A rake of the type described comprising: a pair of supporting wheels; an axle extending between said wheels; a truss enclosing said axle; rake teeth extending forwardly from said truss; hinged levers extending from said axle to said truss to maintain them in their relative relation; and means for raising and lowering said truss relative to said axle; a frame extending rearwardly from said truss; means for universally hinging said frame to said truss at its forward extremity; wheels supporting the rearward extremity of said frame adjustable about vertical pivots; means on said frame for swinging said truss about a horizontal pivot; and vertically with relation to said frame, and means for simultaneously swinging the truss relative to the frame about a vertical pivot and the wheels about vertical pivots.

5. A rake of the type described comprising: a pair of supporting wheels; an axle extending between said wheels; a truss enclosing said axle; the wheels being freely rotatable on the axle; rake teeth extending forwardly from said truss; hinged levers extending from said axle to said truss to maintain them in their relative relation; means for raising and lowering said truss relative to said axle; by means of power derived from the wheels; a frame extending rearwardly from said truss; means for universally hinging said frame to said truss at its forward extremity; caster wheels supporting the rearward extremity of said frame; means on said frame for swinging said truss about a horizontal pivot relative to the frame, and about a vertical pivot relative to the frame; means for swinging said rear wheels about their vertical pivots simultaneously with movement of the truss and about its vertical pivotal connection with the frame.

ARTHUR R. GUNNERSON.